Feb. 1, 1966  G. HANSEN ET AL  3,232,701
METHOD OF CALCINING SODIUM BICARBONATE
Filed Nov. 29, 1961
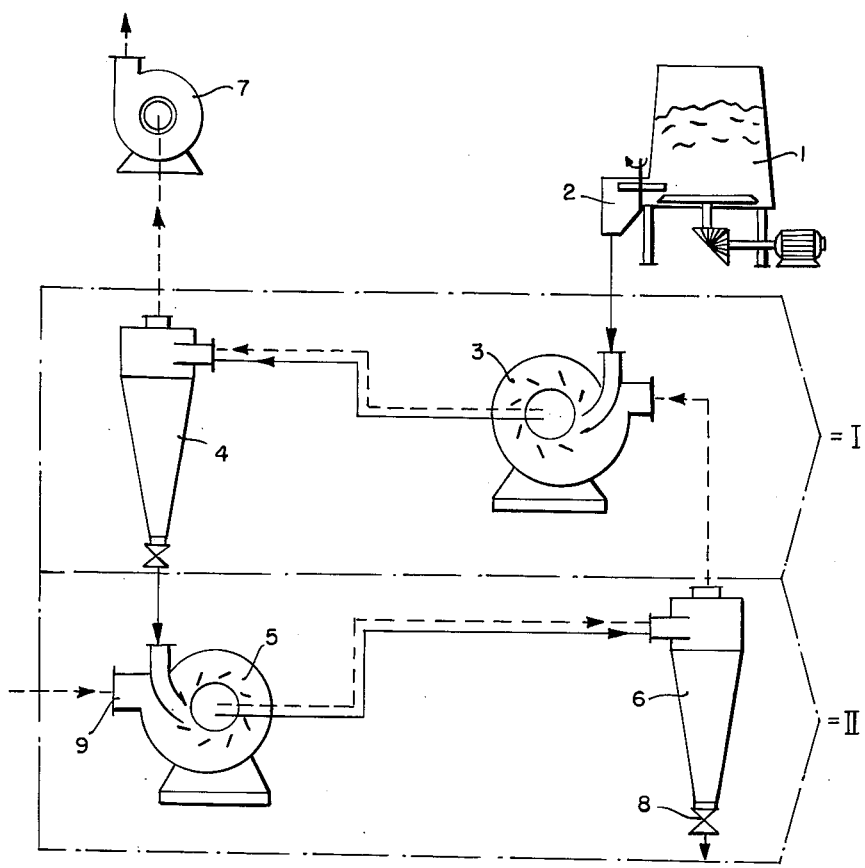
INVENTORS:
GUENTER HANSEN
HANS MUELLER
KARL OTTO SCHMITT
KARL VOGEL
BY
ATT'YS United States Patent Office 3,232,701
Patented Feb. 1, 1966

3,232,701
METHOD OF CALCINING SODIUM BICARBONATE
Guenter Hansen, and Hans Mueller, Ludwigshafen (Rhine), Karl Otto Schmitt, Mannheim, and Karl Vogel, Ludwigshafen (Rhine), Germany, assignors to Badische Anilin- & Soda-Fabrik Aktiengesellschaft, Ludwigshafen (Rhine), Germany
Filed Nov. 29, 1961, Ser. No. 155,599
Claims priority, application Germany, Nov. 29, 1960, B 60,270
2 Claims. (Cl. 23—63)

This invention relates to an improved method for the production of sodium carbonate by calcination of sodium bicarbonate.

Calcination of sodium bicarbonate has hitherto been effected in a rotary kiln provided with indirect heating means. This method has various disadvantages. For example, incrustation by moist sodium bicarbonate or calcination products is liable to occur at the walls of such a furnace. This considerably impairs heat transfer and results in increased energy requirements as well as damage to the apparatus owing to local overheating. It has been proposed to remove incrustation by means of such installations as chains, but these do not ensure complete removal of the crusts. It has also been proposed to prevent the formation of crusts, for example by recycling dried or calcined solids, but this requires large expenditure for apparatus.

According to another known proposal, calcination of sodium bicarbonate is carried out in a fluidized bed by introducing moist sodium bicarbonate into a fluidized bed of heated sodium carbonate particles. The calcined product is withdrawn from the fluidized bed and subdivided into two partial streams, one of them being heated in a heat exchanger to a temperature above the calcination temperature maintained in the fluidized bed. The heated salt is returned to the fluidized bed. This method requires a considerable expenditure of apparatus and affords no satisfactory ultization of energy.

According to a further prior art process, moist sodium bicarbonate is suspended and dried in a hot gas stream of an inert gas and the suspension fed to a heat exchanger maintained at a temperature at which decomposition of sodium bicarbonate into sodium carbonate is ensured. The calcination product is separated from the gas stream and the latter reheated and returned to the circulation. This process does not prevent incrustation of the pipe system of the heat exchanger and the heat exchanger thus becomes clogged up after a short period of operation. Furthermore, the use of two heating means which are separate and moreover have to be maintained at different temperatures is attended by disadvantages.

According to another known method, drying and calcination of sodium bicarbonate are carried out in a single step. For this purpose, the moist salt is suspended in a flash dryer in a gas stream which should preferably be heated to a temperature above 700° C. by reason of the short residence period of the salt in a flash dryer. The extremely high temperatures result in a poor yield of energy and to improve this, part of the off-gas has to be circulated. The possibility of recycling the off-gas is however limited by the fact that the off-gas is laden with water and carbon dioxide. Furthermore, the high temperatures result in the calcination product having a high content of dust and separation of the dust necessitates considerable expenditure for apparatus. As regards chemical purity, such as calcined product is inferior to soda prepared by the conventional ammonia-soda process since, owing to the short residence period, soda prepared in a flash dryer has an ammonia content of more than 0.1%. This is a multiple of the usual value.

It is an object of the present invention to provide a method and apparatus wherein the calcination of sodium bicarbonate can be carried out with a high degree of thermal efficiency. It is a further object of the present invention to provide a method wherein the calcination of the sodium bicarbonate is carried out under very mild conditions.

These and other objects and advantages of our invention are achieved by treating the salt with a heated gas stream in at least two units or systems connected in series, each system comprising a zone for distribution and treatment of the salt in the gas stream and a zone for separation of the salt from the gas stream, the hot gas being passed through the systems without intermediate heating in such a way that it enters the distribution zone of that system, from the separation zone of which the calcined product is withdrawn, and is withdrawn from the separation zone of that system, into the distribution zone of which the solid to be treated is introduced.

For distributing the sodium bicarbonate in the heated gas stream any equipment may be used by which the salt can be kept suspended in the gas stream for prolonged periods, for example a flash dryer that imparts to the solid/gas mixture a spiral movement, or also fluidized bed furnaces.

Suitable separators are cyclones or baffle chambers.

The amount and inlet temperature of the air to be circulated during the process must be adjusted according to the amount and moisture content of the sodium bicarbonate to be calcined. If in a given plant with a given amount of air per unit of time the throughput of sodium bicarbonate is to be increased, it is necessary to increase the inlet temperature of the hot gases. The throughput can also be increased by increasing the amount of hot gas introduced into the plant per unit of time while maintaining the inlet temperature. Obviously, however, this measure can be applied only within certain limits, since with excessive gas velocities the residence periods become very short and the inlet temperature of the gas has to be chosen inconveniently high from a technical point of view.

The temperature of the hot gases introduced into the plant must lie above the decomposition temperature of sodium bicarbonate, which at standard pressure is about 100° C. Since an excessive number of series-connected systems would make a plant uneconomical, temperatures above 300° C. are preferred. The upper limit of the temperature is set by the melting point of soda. The number of series-connected systems also depends on the moisture content of the sodium bicarbonate to be treated.

The invention will now be described in detail with reference to the accompanying diagrammatic drawing.

From a supply vessel 1, moist sodium bicarbonate is supplied via conventional metering means 2 to a flash dryer 3 of system I provided with fixed guide plates, hereinafter referred to as centrifugal dryer. By means of hot off-gas supplied from system II the salt is maintained in suspension and fine distribution, dried by heat exchange and partly calcined. The guide plates incorporated in the centrifugal dryer impart to the gas/solid mixture a spiral movement, the dried and partly calcined and therefore lighter salt particles moving toward the middle of the dryer and being entrained by the off-gas to a cyclone 4. In cyclone 4, the gas and the solid are separated from each other and supplied through a discharge gate to a centrifugal dryer 5 of system II to which fresh hot gas is supplied at 9 in order to complete conversion into sodium carbonate of the sodium bicarbonate dried and pre-calcined in system I. The solid/gas mixture is then separated in a cyclone 6 and the finished product discharged through a discharge gate 8, for example an air lock, whereas the off-gas is supplied to contrifugal dryer 3 to system I. The velocity of the gas stream necessary for the operation of the process is maintained by means of a blower 7. The continuous lines illustrate the path taken by the solids, while the broken lines show the path taken by the hot gases.

A two-stage plant of the type described can be operated with an extremely high degree of thermal efficiency. By using a centrifugal dryer of 1.80 m. in diameter an 0.40 m. in height, 60 metric tons of calcined soda can be produced daily from sodium bicarbonate containing about 9% of water, when the hot gas introduced into system II in an amount of about 12,000 m.$^3$ (S.T.P.) has a temperature of about 550° C. The gas leaves cyclone 6 at a temperature of about 300° C. and cyclone 4 at a temperatuer of about 100° C. Under the said conditions, the degree of heat utilization reaches a value of nearly 70%, the losses being accounted for by fairly similar amounts of heat abstracted by the off-gas and the calcined soda.

Under the conditions specified above, the off-gas leaving cyclone 4 has not reached the saturation point of water. It is therefore possible to use a three-stage plant, by which the degree of heat utilization can be further increase. In addition to considerably improved heat utilization the process according to our invention offers still further advantages. Under the very mild conditions at which the sodium bicarbonate is contacted with the hot gases and liberation of water and carbon dioxide takes place, there is no spontaneous decomposition of the salt and dust formation is therefore substantially precluded. The proportion of dust with a grain size below 0.06 mm. is about 19–23% and the product therefore does not differ from soda calcined in a rotary kiln. As regards the ammonia content, too, the product satisfies the requirements of the soda processing industry. The iron apparatus used shows not product deposits even after operation for several weeks.

What we claim is:

1. In a method of converting sodium carbonate into sodium carbonate in which the sodium bicarbonate is kept in a finely divided condition in a current of hot gas and calcined and then separated from the gas, the improvement which comprises: passing sodium bicarbonate into the calcining and dispersing zone of the first of at least two units connected in series, each of said units including a zone for calcining and dispersing the solids in a hot gas stream and a zone for separating the solids from the gas stream; calcining the sodium bicarbonate in each of said units with said hot gas stream by passing said hot gas initially through the calcining and dispersing zone of the last of said units wherein the solids are finally calcined, the hot gas and solids then being passed to a separator which separates the formed sodium carbonate from the gas, the hot gas then being passed to the preceding calcining and dispersing unit, and thereafter withdrawing said hot gas from the separating zone of the unit into whose dispersing zone the sodium bicarbonate to be calcined is introduced, said hot gas being passed through said units without intermediate heating.

2. A method as in claim 1 wherein moist sodium bicarbonate is passed into the first calcining unit.

References Cited by the Examiner
UNITED STATES PATENTS
2,055,084   9/1936   MacMullin _____ 23—63
FOREIGN PATENTS
883,202   11/1961   Great Britain.

MAURICE A. BRINDISI, *Primary Examiner.*
GEORGE D. MITCHELL, *Examiner.*